Figure 1:
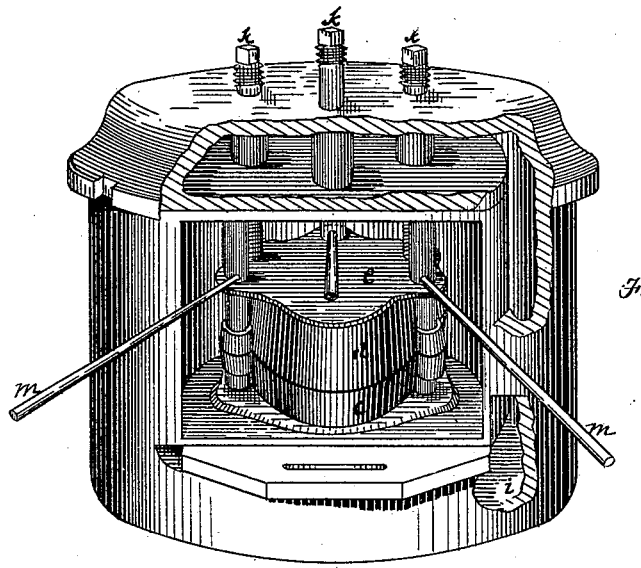

(No Model.)  2 Sheets—Sheet 1.

J. R. FINNEY.
DENTAL FLASK.

No. 250,513.  Patented Dec. 6, 1881.

Witnesses,
John K. Smith
L. C. Titler

Inventor,
Joseph R. Finney
by his attys
Bakewell & Kerr (No Model.)  2 Sheets—Sheet 2.

J. R. FINNEY.
DENTAL FLASK.

No. 250,513. Patented Dec. 6, 1881.

Witnesses.
John K Smith
L. C. Fitler.

Inventor
Joseph R. Finney
by his attys
Bakewell & Kerr

UNITED STATES PATENT OFFICE.

JOSEPH R. FINNEY, OF PITTSBURG, PENNSYLVANIA, ASSIGNOR OF ONE-HALF TO LEE S. SMITH, OF SAME PLACE.

DENTAL FLASK.

SPECIFICATION forming part of Letters Patent No. 250,513, dated December 6, 1881.

Application filed June 3, 1881. (No model.)

*To all whom it may concern:*

Be it known that I, JOSEPH R. FINNEY, of the city of Pittsburg, in the county of Allegheny and State of Pennsylvania, have invented a new and useful Improvement in Dental Flasks; and I do hereby declare the following to be a full, clear, and exact description thereof.

In the manufacture of plates for artificial teeth from celluloid a blank having the general form of the plate to be made is placed between plaster molds which have the desired "impression." Then the mold is put in a small stove called a "heater," and pressure is applied to force the mold together on the blank, which, being softened or rendered plastic by the heat, will take the shape of the impression. One effect of the heat upon the celluloid is to cause it to swell and become spongy in cooling if not restrained by the mold. This distorts the plate and produces a misfit. It is therefore necessary to the production of a perfect plate that it be cooled under pressure. To accomplish this the mold must either be permitted to cool slowly with the heater or the flask locked while under pressure in the heater, so that when removed for cooling the parts will not give or be caused to separate by the expansion of the plate. The first plan is effective; but it is objectionable, because it requires a long time for the heater to cool, the separate firing of the heater for each plate, and deprives the dentist of the use of the heater, except for one plate at a time, whereas he should be able to make a number of plates at a heat. The second plan has not been successfully carried out. Various devices have been used. One of these was a flask composed of two parts, the bottom part having two standards opposite each other and projecting above the top, and the upper part secured to the lower by a bar extending centrally across it between the standards, being secured thereto while the flask is in the heater and under pressure. This device, however, does not answer well in practice, as the upper part is found to pivot against the central bar and tip on either one side or the other, raising slightly and permitting the swelling or sponging of the plate, and thereby rendering it unfit for use. Another device has the standards with recesses between them and the sides of the upper part of the flask, and keys which are inserted into said recesses to secure the two parts together. This device, however, is not a success, because the keys pry out, and either bend or break off the standards, thereby loosening or destroying the fastening.

My invention consists of a lock-flask that can be locked easily and firmly while in the heater before the pressure-screws are loosened, and which can then be removed from the heater without trouble or danger of loosening the fastening.

It also consists of a flask made up of removable, reversible, invertible, and interchangeable rings, whereby it can be fixed to hold and mold impressions of varied and irregular shape. I know of no other flask possessing this characteristic.

To enable others skilled in the art to make and use my invention, I will now describe it by reference to the accompanying drawings, in which—

Figures 8, 9:
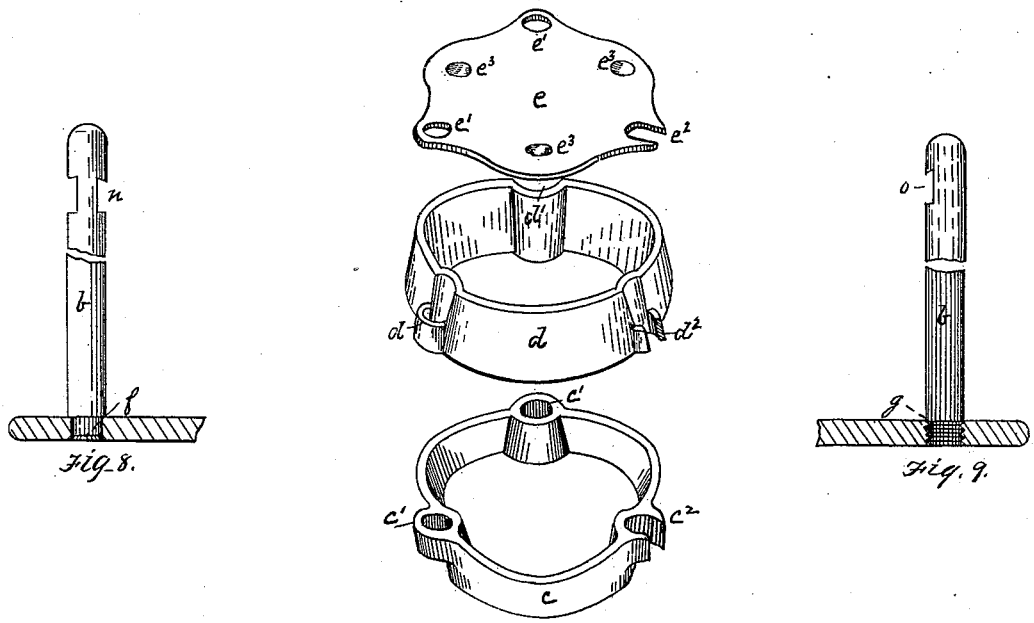
Figure 2:
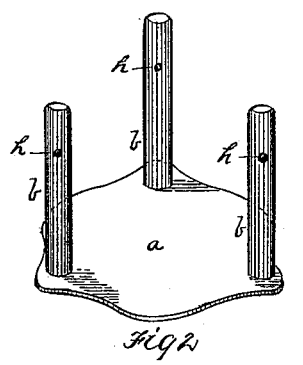
Figure 3:
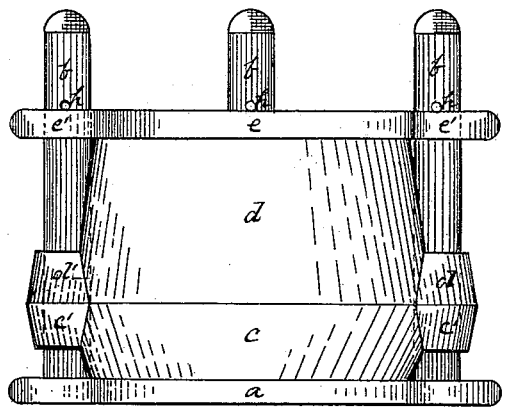
Figure 4:
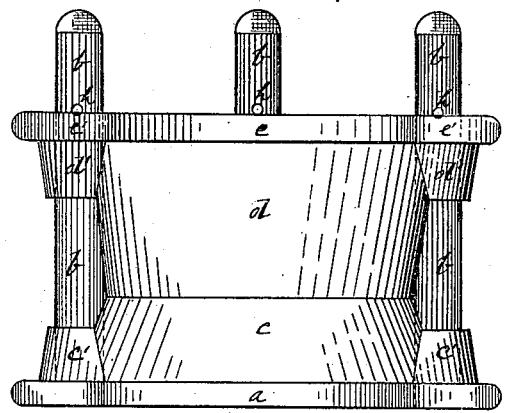
Figure 5:
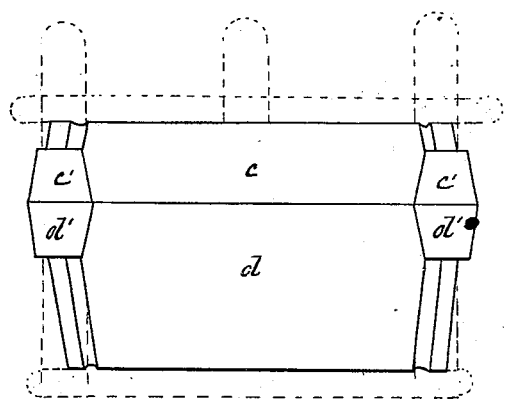
Figure 6:
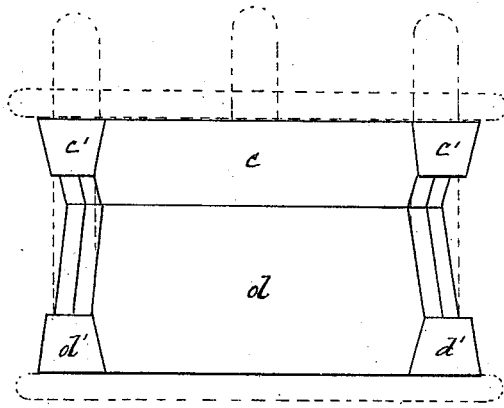

Figure 1 is a perspective view, partly in section, of a dental-plate heater, showing the flask in position. Fig. 2 is a perspective view of the different parts of the flask separated. Figs. 3 and 4 are side views of the flask. Figs. 5 and 6 are diagrams, and Fig. 7 a plan view, showing different arrangements of the parts. Figs. 8 and 9 illustrate the construction and attachment of the standards.

Like letters of reference indicate like parts in each.

Figure 7:
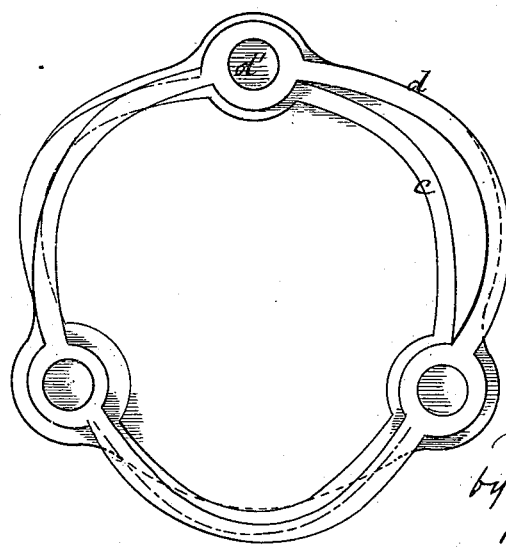

My improved flask is composed of a bottom plate, $a$, having three perpendicular pins or standards, $b$, two irregularly-shaped rings, $c$ and $d$, and a top plate, $e$, each of which is provided with holes or recesses $c'$ $d'$ $e'$, for the passage of the pins or standards $b$. The pins $b$ and holes $c'$ $d'$ $e'$ are regularly spaced in the several parts $c$ $d$ $e$, so that they may be turned around or upside down and be placed on the pins $b$ with equal ease as when in the usual position. This is illustrated in Figs. 3 to 7. Fig. 3 shows the usual position, the narrow ring $c$ being below and the wide ring $d$ above. Fig. 4 shows the same arrangement, but with the rings turned upside down. Fig. 5 shows the wide ring below and the narrow ring above. Fig. 6 shows the same arrangement as Fig. 5, but with the rings upside down, as in Fig. 4; and Fig. 7 shows one of the rings turned on its axis, so that its curves do not coincide with those of the other ring. The rings are made flaring—that is, of greater diameter at one edge than at the other. The greater and less diameters of each are equal to the greater and less diameters of the other. They are of irregular curve. As placed in Fig. 1 the edges coincide; but if one of the rings is turned on its axis, they do not coincide, as is illustrated in Fig. 7. The purpose of this is to fit it to contain molds of different shapes. The casts are very irregular, and it requires all of the different arrangements I have shown to get the impressions into an ordinary-sized flask. Fig. 7 is designed for an impression of a laterally-crooked jaw. Heretofore it has been necessary to use a number of differently-shaped flasks to accommodate these different shapes; but with my flask this is unnecessary, as it will conform to all usual shapes.

The pins $b$ are secured in the holes in plate $a$ by upsetting their ends therein, as at $f$, Fig. 8, or by a screw-thread, as at $g$, Fig. 9, and they are each provided with a hole, $h$, near the upper end. The holes $h$ are for the reception of the locking devices. The pins are three or more in number, and the holes $h$ are parallel to each other, or nearly so.

Fig. 1 shows the heater, which is of a common form, having a surrounding water-jacket, $i$, it being heated by hot water. The flask is put into the heater with the holes $h$ facing the door. The pressure-screws $k$ are then screwed down on the top $e$, bearing thereon at $e^3$, Fig. 2. This forces the parts of the flasks tightly together as the plate becomes softened or plastic by the heat, and brings the holes $h$ above the plate. I then open the door and insert into each of them an old dental excavator, $m$, or other suitable implement. This secures the top plate firmly in place and locks the flask at three different points, so that there can be no pivoting or raising of the top at any place, and the strain coming longitudinally on the pins cannot bend or strain them. The pressure-screws are then loosened, and the flask lifted out of the heater by the excavators $m$ and plunged into water to cool it rapidly. The heater is thus free for immediate use with another plate.

Flasks have been locked by nuts screwing on the pins; but it was necessary to remove them from the heater before the nuts could be put on, and this removal permitted the swelling of the plate before the nuts could be put on.

Instead of the holes $h$, double or single dovetail recesses $n$, Fig. 8, or $o$, Fig. 9, may be provided for use with corresponding keys.

The flask is preferably made of cast-iron.

What I claim as my invention, and desire to secure by Letters Patent, is—

1. A lock-flask composed of a bottom plate with three or more pins, having locking holes or recesses, two flaring irregular rings, and a top plate fitting over the pins, substantially as and for the purposes described.

2. A lock-flask composed of a bottom plate having three or more pins or standards, two or more reversible, invertible, interchangeable, flaring rings, and a top plate, the said rings and top plate fitting over or between said standards, substantially as and for the purposes described.

3. A lock-flask having three or more standards, over or between which the removable parts are placed, provided with holes or recesses for the insertion of the locking devices.

In testimony whereof I have hereunto set my hand.

JOSEPH R. FINNEY.

Witnesses:
THOS. B. KERR,
R. H. WHITTLESEY.